UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

SHOE-BOTTOM FILLER.

1,120,634.   Specification of Letters Patent.   Patented Dec. 8, 1914.

No Drawing. Original application filed May 11, 1908, Serial No. 432,083. Divided and this application filed July 1, 1912. Serial No. 707,020.

*To all whom it may concern:*

Be it known that I, ANDREW THOMA, a citizen of the United States, and resident of Cambridge, county of Middlesex, State of Massachusetts, have invented an Improvement in Shoe-Bottom Fillers, of which the following description is a specification.

My present invention relates to shoe-filling compositions, and this application is a derivative of my previous application Serial No. 432,083, filed May 11, 1908 (now Pat. 1,032,312, July 9, 1912). As disclosed in that application, which is in part a derivative of my Patent No. 832,002, September 25, 1906, I have found that several materials have qualities which adapt them for use as binders in shoe-filling compositions, *i. e.* compositions used in filling in the innersoles or shoe bottoms of shoes of certain kinds. The compositions are usually composed of cork or ground leather and a suitable binder. Wax-tailings, a product of petroleum distillation, is, as stated in that application, such a binder, and because it is sticky, tenacious, always the same, and easily responsive, or sensitive, to heat, is very well suited to the purpose. The low-melting, stickier kinds, however, have certain objections, *i. e.* they are too sticky or runny, too penetrative or easily absorbed by the body-material or ground cork, etc., and are so sticky as to follow the knife of the operator in the act of filling the shoe-bottom cavity when used cold. Hence, it is better to introduce with this waxy, sticky material or its equivalent, some sleeking or smoothing and restraining, slow-drying component. One that I have found very useful for the purpose is albumen, and the combination of a waxy base of a permanently sticky, tenacious, heat-responsive and quick-setting adhesive, with albumen, is the subject of my present invention. Albumen is a nitrogenous compound, usually though not always, of animal origin. The two common forms are egg albumen (white of egg) and serum or blood albumen. Both of these may be obtained dry. Albumen is soluble in water up to near the boiling point, when it hardens and becomes insoluble in practically all solvents. This phenomenon, which seems to be a species of polymerization and which is usually termed coagulation, I take advantage of in my composition here presented and claimed. The most familiar instance of this phenomenon, is the hardening of the white of an egg by boiling. The same effect can be produced by acids and other reagents, but moist heat is usually the most effective agent for my purpose. Albumen when moist will soon spoil by putrefaction, but when thoroughly dried keeps indefinitely.

In carrying out my invention, I mix with my binder, which may be any of the binders mentioned or referred to in my above mentioned application, but which I prefer to be in great part or altogether wax tailings, a quantity of dry albumen. To this I add a quantity of water sufficient to dissolve the albumen to a gelatinous condition and stir the mixture well, warming it if need be, but to a temperature not much above 100° F. The albumen gelatinizes and makes the mass thicker. To this I add a quantity of elastic absorbent material such as granulated cork or ground leather enough to make, when stirred well, a stiff dough. The albumen in thickening the tailings, reduces the liability of the tailings to be absorbed by the fibrous filler-material, so that only the surface of each particle of the filler-body material becomes charged with the adhesive, leaving a core practically free from the binder and capable of retaining during the life of the shoe its natural elasticity or resiliency. This material works well under the laying tool or spatula and under conditions of use is practically waterproof. It may be made entirely waterproof by treatment with some agent capable of hardening the albumen, as steam or other heat at about the boiling point of water. This stiffens the composition but does not materially affect its elasticity.

I may use any of the materials specified in my former application above identified to supplement the albumen such as starch paste, gluten, gum, dextrin, gelatin, casein, soluble silicates.

I may prepare my composition for the trade by packaging it without the filler leaving the shoe manufacturer to add what he wishes of that nature. I may also leave out the water and package the composition of tailings and dried albumen alone, letting the shoe manufacturer do his own mixing.

Having described my invention, what I claim as new and desire to secure by Letters Patent is:

1. A compound for a shoe-filler, comprising albumen and wax tailings.

2. A shoe-filler, comprising albumen, wax tailings, and comminuted filler-body material.

3. The combination, in a shoe-filling composition of a permanently sticky, tenacious, slow-drying waxy adhesive, and a restraining agent consisting at least in part of albumen.

4. The combination, in a shoe-filling composition, of a permanently sticky, tenacious, slow-drying adhesive, albumen. moisture, and comminuted body material mixed to the consistency of a normally pliable, plastic, doughy mass, moldable into a shoe-bottom cavity.

5. A shoe-filler, comprising wax tailings, albumen, moisture, and granulated cork, so proportioned and mixed that the absorption of the tailings into the cork is slight, leaving each particle of the cork with a core practically free of the absorbable tailings and having its natural resiliency.

6. A shoe-filler, comprising a permanently sticky tenacious binder consisting at least in part of wax tailings, a gelatinized restraining agent consisting at least in part of gelatinized albumen, and a comminuted body material.

7. A shoe-filler, comprising a permanently sticky tenacious absorbable binder, albumen in a gelatinized condition from moisture, and a comminuted absorbent body-material, the materials being so proportioned and mixed that the absorption of the binder into the particles of the body material is only partial, whereby each of said particles retains a core practically free from the absorbable binder, said core thereby having its natural character practically unmodified.

8. A shoe-filler, comprising a permanently sticky tenacious binder, a coagulable restraining agent and a comminuted filler-body material admixed to a doughy condition in a permanently pliable mass.

9. A shoe-filler, comprising a permanently sticky tenacious binder, a restraining agent coagulable by heat and a comminuted filler-body material admixed to a doughy condition in a permanently pliable mass.

10. A shoe-filler, comprising a permanently sticky binder, a coagulable restrainer, and granulated cork.

In testimony whereof, I have signed my name to this specification, in the presence of two subscribing witnesses.

ANDREW THOMA.

Witnesses:
GEO. H. MAXWELL,
R. J. HERSEY.